United States Patent
Yopp et al.

(10) Patent No.: US 8,140,225 B2
(45) Date of Patent: Mar. 20, 2012

(54) SYSTEM AND METHOD FOR CLASSIFYING A TARGET VEHICLE

(75) Inventors: Wilford Trent Yopp, Canton, MI (US); Peter Gyumyeong Joh, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1052 days.

(21) Appl. No.: 12/041,172

(22) Filed: Mar. 3, 2008

(65) Prior Publication Data

US 2009/0222172 A1    Sep. 3, 2009

(51) Int. Cl.
*G06F 7/00* (2006.01)

(52) U.S. Cl. ............................ 701/45; 701/300; 342/109

(58) Field of Classification Search .................... 701/45, 701/32, 300, 301; 340/436; 280/735; 342/109
See application file for complete search history.

(56) References Cited

U.S. PATENT DOCUMENTS

| | | | |
|---|---|---|---|
| 4,757,450 A | 7/1988 | Etoh et al. | |
| 5,471,214 A | 11/1995 | Faibish et al. | |
| 5,529,138 A | 6/1996 | Shaw et al. | |
| 5,714,928 A | 2/1998 | Sudo et al. | |
| 6,084,508 A | 7/2000 | Mai et al. | |
| 6,304,321 B1 | 10/2001 | Wangler et al. | |
| 6,343,810 B1 | 2/2002 | Breed | |
| 6,466,863 B2 | 10/2002 | Shirai et al. | |
| 6,484,087 B2 | 11/2002 | Shirai et al. | |
| 6,517,172 B1 | 2/2003 | Bond, III | |
| 6,523,912 B1 | 2/2003 | Bond, III et al. | |
| 6,532,408 B1 | 3/2003 | Breed | |
| 6,639,543 B2 | 10/2003 | Puglia | |
| 6,640,182 B2 | 10/2003 | Matsui | |
| 6,650,983 B1 | 11/2003 | Rao et al. | |
| 6,885,968 B2 | 4/2005 | Breed et al. | |
| 6,950,014 B2 | 9/2005 | Rao et al. | |
| 7,049,945 B2 | 5/2006 | Breed et al. | |
| 7,486,803 B2 * | 2/2009 | Camus | 382/104 |
| 7,660,438 B2 * | 2/2010 | Camus | 382/104 |
| 2005/0267657 A1 * | 12/2005 | Devdhar | 701/35 |
| 2005/0278098 A1 | 12/2005 | Breed | |
| 2007/0228705 A1 * | 10/2007 | Rao et al. | 280/735 |
| 2009/0018711 A1 | 1/2009 | Ueda et al. | |

FOREIGN PATENT DOCUMENTS

JP        7200990 A    8/1995

OTHER PUBLICATIONS

Dabbour E et al., Perceptual Framework for a Modern Left-Turn Collision Warning System, International Journal of Applied Science, Engineering and Technology 5,vol. 1, 2009, pp. 8-14.
Press Release, Continental, New Type of Precrash Sensor is Able to Prevent Many Accidents in Urban Traffic, Apr. 18, 2007, pp. 1-4.
Press Release, Continental, World Premiere of Continental Sensor System in The New Volvo XC60, Mar. 31, 2008, pp. 1-4.

* cited by examiner

*Primary Examiner* — Drew Brown
(74) *Attorney, Agent, or Firm* — Frank A. MacKenzie; Brooks Kushman P.C.

(57) ABSTRACT

A system and method for classifying a target vehicle using a sensor system, including a plurality of target vehicle sensors. The sensor system acquiring target vehicle data points that define at least an upper and lower portion of the target vehicle. The sensor system reconstructing a target vehicle shape using the target vehicle data points to provide a first and second target vehicle classification value. The sensor system determining an overall target vehicle classification based in part upon the first and second target vehicle classification values.

20 Claims, 6 Drawing Sheets

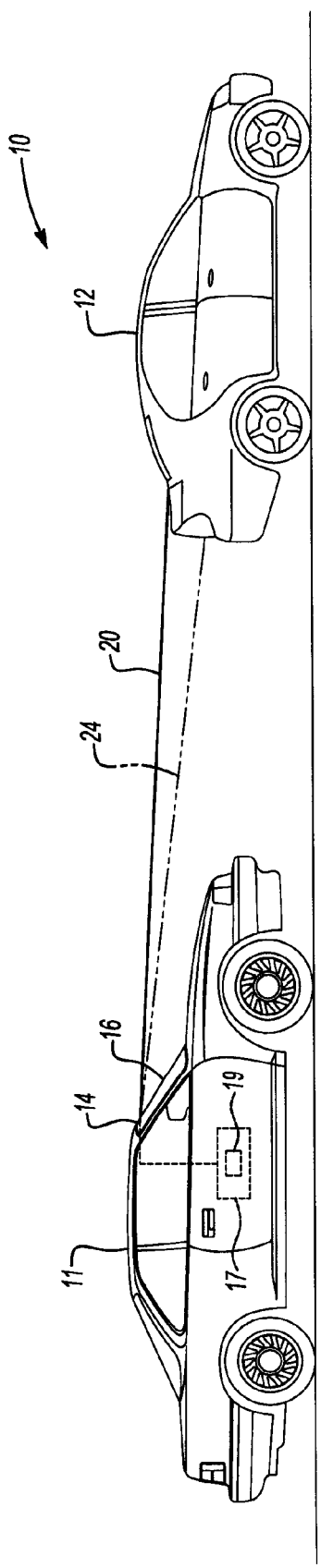
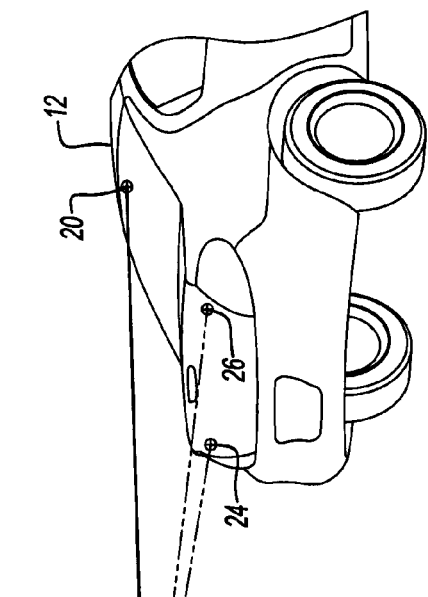
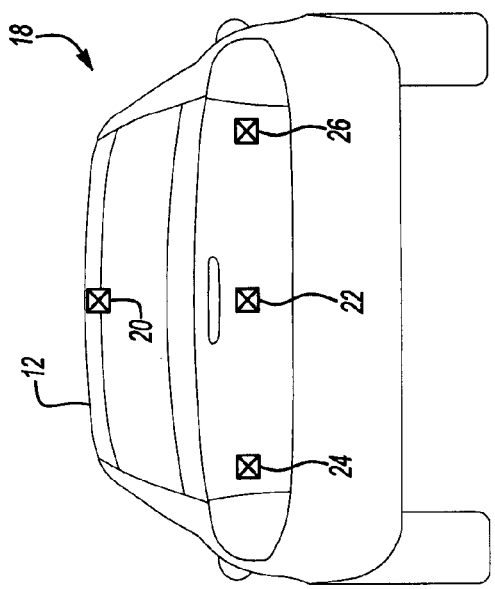

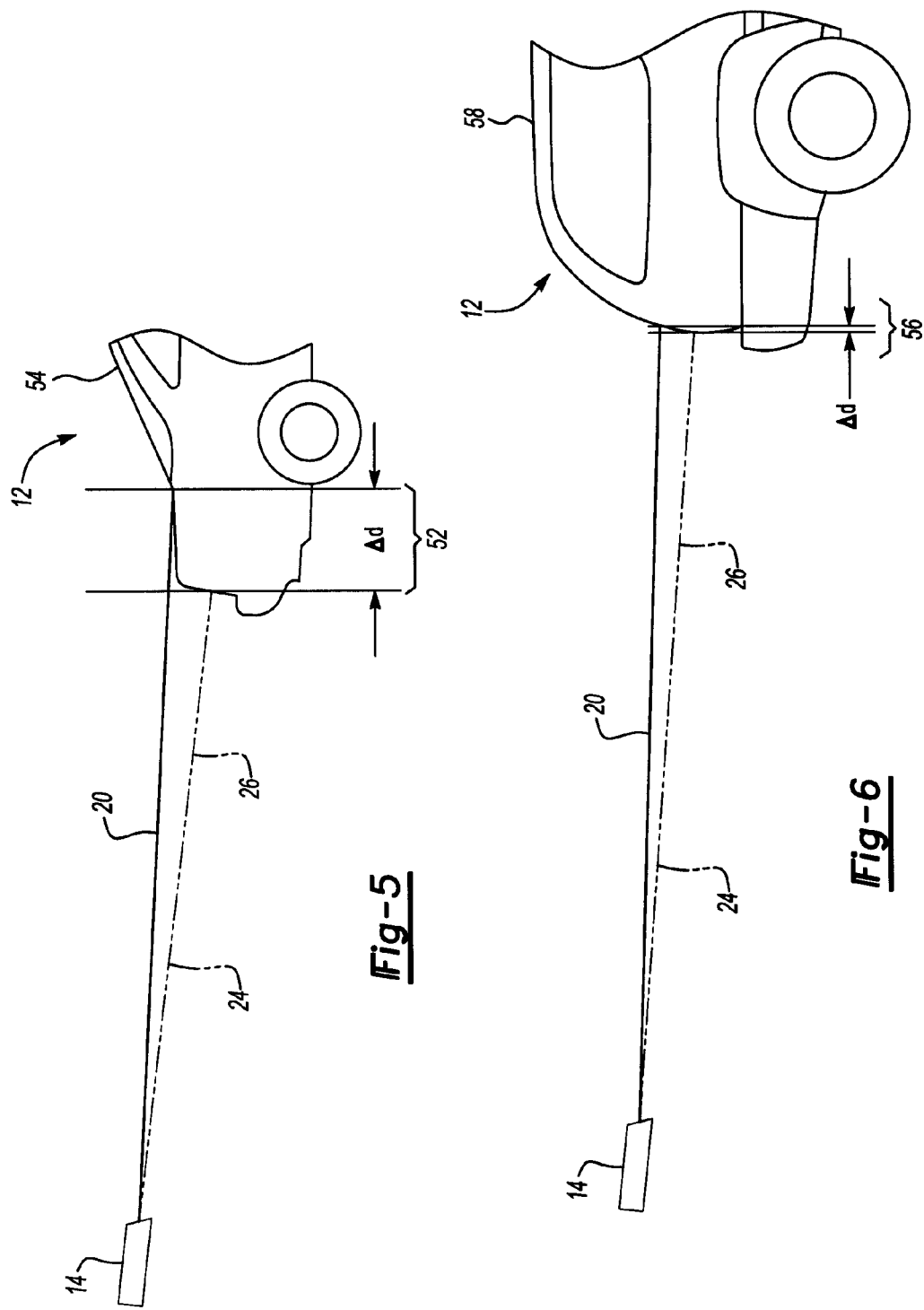

SYSTEM AND METHOD FOR CLASSIFYING A TARGET VEHICLE

TECHNICAL FIELD

The present application relates to a system and method for classifying a target vehicle using a target vehicle classification sensor system.

A detailed description and accompanying drawings are set forth below.

BRIEF DESCRIPTION OF THE DRAWINGS

FIG. 1 is a simplified, exemplary environmental diagram depicting a host vehicle approaching a target vehicle according to an embodiment of the system described herein;

FIG. 2A is an alternate, simplified, exemplary environmental diagram depicting an embodiment of the system described herein;

FIG. 2B is a simplified, exemplary perspective view depicting an embodiment of the system described herein;

FIG. 5 is a simplified, exemplary environmental diagram depicting another embodiment of the system described herein;

FIG. 6 simplified, exemplary environmental diagram depicting another embodiment of the system described herein;

DETAILED DESCRIPTION OF THE PREFERRED EMBODIMENT(S)

Figure 3:
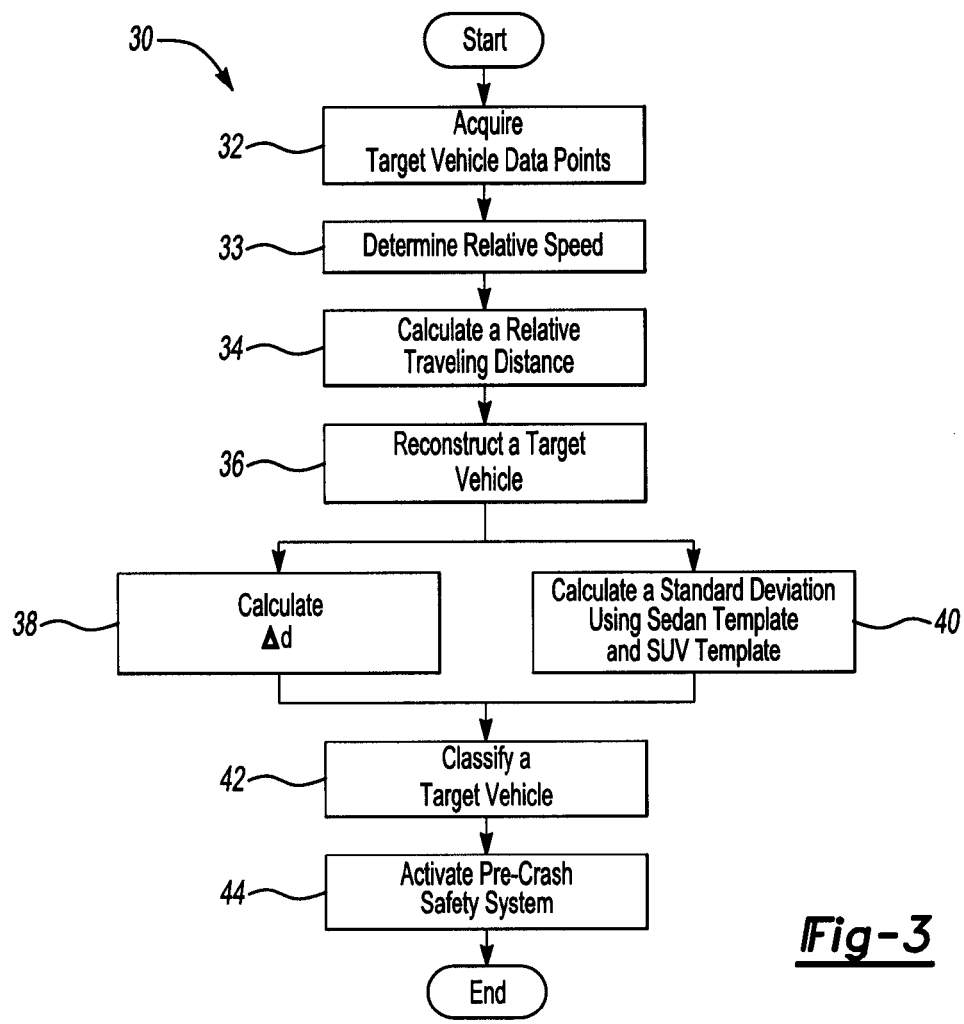
FIG. 3 is a simplified, exemplary flow chart depicting an embodiment of the method described herein.

With reference to FIGS. 1-10, a more detailed description of embodiments of the system and method and various components thereof will now be provided.

Vehicle safety systems are becoming increasingly more prevalent in today's vehicles. Such vehicle safety systems are being incorporated in order to reduce the likelihood or prepare a host vehicle for an imminent crash situation. However, in order for vehicle safety systems to perform such operations, accurate target vehicle classification may be required.

One conventional vehicle safety system is a Collision-Mitigation-By-Braking (CMBB) system. CMBB systems operate by braking the host vehicle in order to reduce the kinetic energy of an imminent impact, thereby greatly reducing the severity of the imminent crash.

However, CMBB systems do not depend upon accurate classification in order to be effective. CMBB systems typically require only that an object be determined to be in front of the host vehicle. Once such a determination is made, the CMBB system may operate to slow or avert collision with the object.

Another conventional vehicle safety system is an Adaptive Cruise Control (ACC). ACC operates by automatically adjusting the vehicle speed and distance to that of a target vehicle. The ACC system can operate to decelerate or accelerate the vehicle according to the desired speed and distance settings established by a host vehicle driver.

However, ACC systems do not prepare the host vehicle for imminent crash situations. Furthermore, ACC systems do not require accurate target classification. ACC systems simply require determination that a target vehicle exists in front of the host vehicle. Once existence of the target vehicle is determined, the ACC system operates to ensure a safe speed and distance are maintained.

With reference to the drawings, FIG. 1 is a simplified, exemplary environmental diagram depicting an embodiment of a target vehicle classification sensor system 10. As shown therein, FIG. 1 illustrates a host vehicle 11 approaching a target vehicle 12. The host vehicle 11 may include a plurality of target vehicle sensors 14 that may be implemented in order to assist in avoiding or reducing the severity of collisions with the target vehicle 12. The plurality of sensors 14 may be placed within the host vehicle 11 in a suitable location that protects the sensors 14 from external elements. For example, the sensors 14 may be placed in the host vehicle 11 behind a front windshield 16 proximate a rear-view mirror (not shown). Such placement may protect the sensors 14 from the external elements during classification of the target vehicle 12. It should be noted, however, that the ultimate placement of sensors 14 can vary without departing from the scope of the present application.

As previously described, the sensor system 10 may use a plurality of sensors 14. For example, the sensor system 10 may include at least a first sensor 14a and a second sensor 14b (FIG. 2B). The present application contemplates that the greater the number of sensors incorporated, the more accurate the classification of the target vehicle 12. Furthermore, the sensors 14 may sense the target vehicle 12 using infra-red (IR) or other closing velocity (CV) sensors. When using CV sensors to classify a target vehicle, distance data may be obtained based upon velocity changes. However, the present application also contemplates the sensor system 10 may sense the target vehicle 12 using distance sensors such as vision sensors, ultrasonic sensors, or the like.

The sensor system 10 may also include a controller 17. The controller 17 may be used to receive the sensed target vehicle data from the sensors 14. Furthermore, the controller 17 may use the sensed target vehicle data in order to classify the target vehicle 12.

With reference to FIG. 2A, the sensor system 10 may scan multiple portions of the rear end 18 of the target vehicle 12. More specifically, the sensor system 10 may emit a signal from each of the plurality of sensors 14 to a specified area in front of the host vehicle 11. If the emitted signal strikes the rear end 18 of the target vehicle 12, the emitted signal is reflected back to the host vehicle 11. The reflected signal may be received by the plurality of sensors 14. The controller 17 may then use the emitted and received signals in order to determine the distance between the target vehicle 12 and the host vehicle 11.

With reference back to FIG. 2A, the sensor system 10 may scan an upper portion 20 and a lower portion 22 of the target vehicle 12. The present application further contemplates that the sensor system 10 may also scan the rear end 18 at the upper portion 20, a lower left portion 24 and a lower right portion 26. As previously described, the sensor system 10 may scan additional locations of the target vehicle 12 with the aid of additional sensors in order to enhance the accuracy of the target vehicle classification.

FIG. 2B illustrates a perspective view of the target vehicle 12. FIG. 2B further illustrates the sensors 14 scanning the upper 20, lower left 24, and lower right 26 portions of the target vehicle 12. By scanning the upper 20, the lower left 24, and the lower right 26 portions, the sensor system 14 may increase the accuracy of the target vehicle classification.

FIG. 3 illustrates a simplified, exemplary flow chart 30 for classifying the target vehicle 12. Block 32 relates to the sensor system 10 acquiring target vehicle data points by scanning the upper portion 20, the lower left portion 24, and the lower right portion 26 of the target vehicle 12 and storing each acquired target vehicle data point. The sensor system 10 may continuously acquire the target vehicle data points as the host vehicle 11 approaches the target vehicle 12. In addition, the sensor system 10 may be programmed to acquire target vehicle data points only when a target vehicle 12 is within a certain distance of the host vehicle 11. For example, the sensor system 10 may be programmed to acquire target vehicle data points only when the target vehicle 12 is within 5 meters of the host vehicle 11. By using the 5 meter distance, the reliability of the target vehicle data points may be increased and the number of intermittently dropped target vehicle data points may be reduced. However, it is likewise contemplated that the 5 meter distance may be adjusted depending on the sensor system 10, performance of the sensor system 10, transmittance coefficient of the front windshield 16, the relative speed of the target vehicle 12, or other system parameters or requirements known to one of ordinary skill in the art.

Block 33 relates to determining a relative speed of the target vehicle 12. The relative speed may relate to how quickly the host vehicle 11 is approaching the target vehicle 12. The sensor system 10 may use the acquired target vehicle data points and the known speed of the host vehicle 11 in order to determine the relative speed of the target vehicle 12.

Block 34 relates to calculating a relative traveling distance. The relative traveling distance may be calculated from the relative speed of the host vehicle 11 to the target vehicle 12. The relative traveling distance may be required to determine when both the host vehicle 11 and the target vehicle 12 are in motion. The shape of the target vehicle 12 may be reconstructed using the target vehicle data points and the calculated relative traveling distance.

Figure 4:
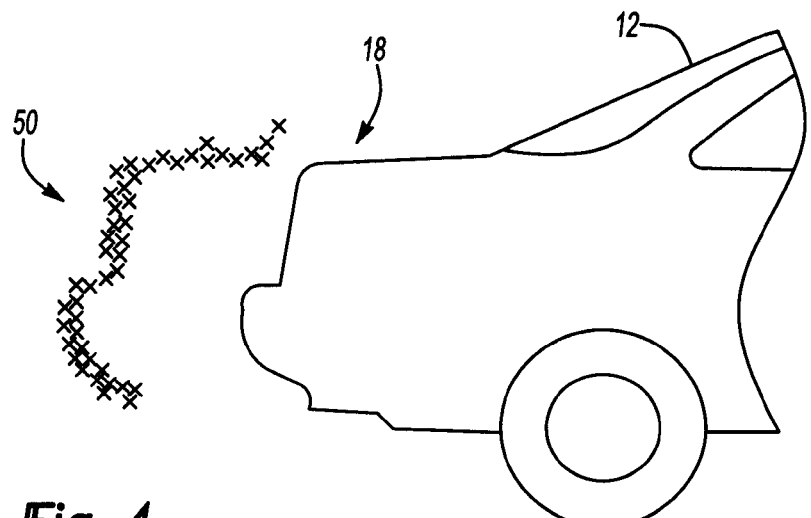
FIG. 4 is a simplified, exemplary environmental diagram depicting another embodiment of the system described herein.

Block 36 relates to the sensor system 10 reconstructing the shape of the target vehicle 12. FIG. 4 illustrates a simplified, exemplary environmental diagram of a reconstructed target vehicle shape 50 that corresponds to the overall shape of the rear end 18 of the target vehicle 12. The reconstructed target vehicle shape 50 may include multiple target vehicle data points in order to develop an accurate representation of the rear end 18 of the target vehicle 12.

It is further contemplated that a Kaman filter algorithm may be applied at block 36 in order to further refine the reconstructed target vehicle shape 50. The Kaman filter may be used in order to eliminate erroneous target vehicle data points and erroneous traveling distance estimations, thereby, refining the reconstructed target vehicle shape 50.

With reference back to FIG. 3, block 38 relates to calculating a delta distance (Δd) representing the horizontal difference between the measured distances of sensor system 10. For example, the sensor system 10 may take an acquired vehicle data point, at a particular time (t), for the upper portion 20 and the lower portion 22 and determined the Δd between the two points. Using the calculated difference, the sensor system 10 may identify the target vehicle 12 and correspondingly assign a first target vehicle classification value. As another example, the sensor system 10 may take an acquired target vehicle data point for the upper portion 20 and the lower left portion 24 and determine the Δd between the two points. The sensor system 10 may also take an acquired target vehicle data point for the upper portion 20 and the lower right portion 26 and determine the Δd between those two points. Using the calculated differences, the sensor system 10 may identify the target vehicle 12 and correspondingly assign a first target vehicle classification value.

FIG. 5 is a simplified, exemplary environmental diagram illustrating the Δd when the target vehicle 12 is, for example, a sedan 54. As illustrated, the upper portion 20 may be offset from the lower left portion 24 and/or the lower right portion 26. A calculated Δd 52 may then be determined with respect to the upper portion 20 and the lower left 24 and/or lower right portion 26. If the Δd 52 is relatively large, the sensor system 10 may identify the target vehicle 12 as a sedan (as is shown in FIG. 5) and correspondingly assign a sedan as the first target vehicle classification value.

FIG. 6 is a simplified, exemplary environmental diagram illustrating the Δd when the target vehicle 12 is, for example, a Sports Utility Vehicle (SUV) 58. Again, the upper portion 20 may be offset from the lower left portion 24 and/or the lower right portion 26. However, the Δd 56 between the upper 20, lower left 24 and/or lower right 26 portions of the target vehicle 12 may be relatively small. Hence, the sensor system 10 may identify the target vehicle 12 as being an SUV (as is shown in FIG. 6) and correspondingly assign an SUV as the first target vehicle classification value.

Figure 7:
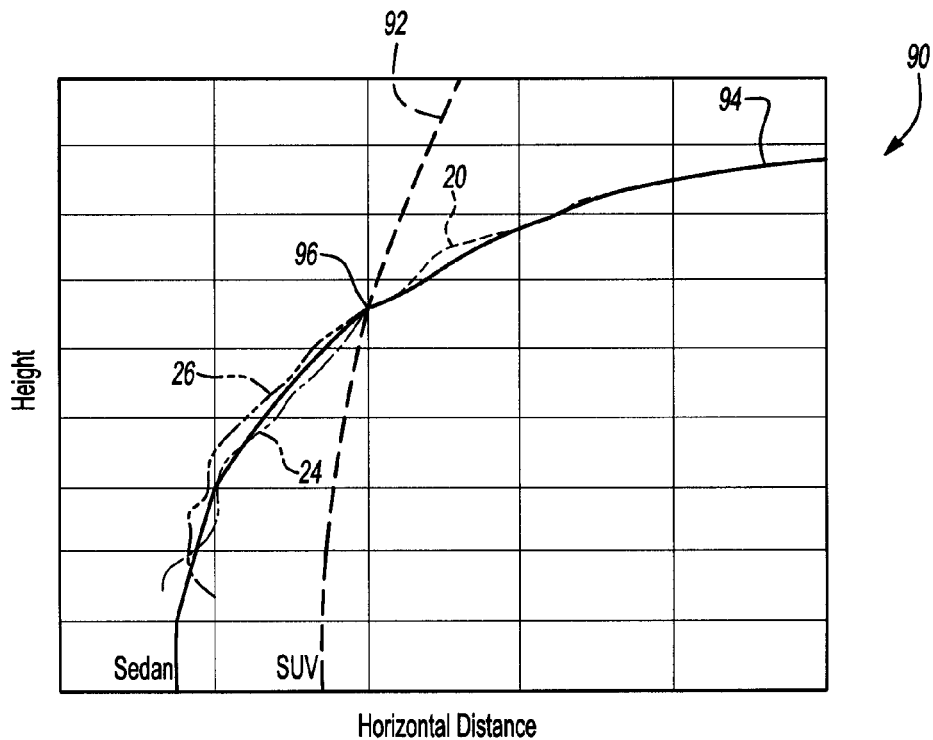
FIG. 7 is a simplified, exemplary graphical plot depicting an embodiment of the system described herein.

With reference back to FIG. 3, block 40 relates to calculating standard deviations between the reconstructed target vehicle shape 50 and a plurality of target vehicle templates. To this end, FIG. 7 depicts a simplified, exemplary environmental diagram demonstrating how the sensor system calculates the standard deviation values. This operation can be best illustrated using plot 90. For example, the plurality of target vehicle templates may include an SUV vehicle template 92 and a sedan vehicle template 94, which intersect each other at intersection point 96. Intersection point 96 may represent a selected vehicle height suitable for classifying target vehicles based upon an analysis of the reconstructed target vehicle shape 50 when compared against the plurality of target vehicle templates. While FIG. 7 illustrates this operation using the SUV vehicle template 92 and the sedan vehicle template 94, the present application contemplates that other target vehicle templates may be incorporated depending upon design requirements and system capabilities.

The sensor system 10 may then superimpose the reconstructed target vehicle shape 50 upon the SUV vehicle template 92 and sedan vehicle template 94 such that an acquired target vehicle data point corresponding to the selected height defining intersection point 96 is located at intersection point 96. Once the reconstructed target vehicle shape 50 is superimposed accordingly, a standard deviation for each target vehicle template with respect to the reconstructed target vehicle shape 50 may be calculated. The sensor system 10 may calculate each standard deviation using the following formula:

$$\mu_k = \left(\frac{k-1}{k}\right)\mu_{k-1} + \frac{1}{k}x_k$$

and $$\sigma_k^2 = \frac{k-1}{k} \cdot \sigma_{k-1}^2 + \frac{1}{k-1} \cdot (x_k - \mu_k)^2$$

where,
k is the time index;
$x_k$ is the distance input at time k;
$\mu_k$ is the mean value at time k; and
$\sigma_k$ is the standard deviation at time k.

The closer a calculated standard deviation value for a given target vehicle template is to zero, the more likely that the reconstructed target vehicle shape 50 conforms to that target vehicle template. As an example, plot 90 of FIG. 7 demonstrates that the standard deviation corresponding to the sedan vehicle template 94 is relatively small (or less than) the standard deviation corresponding to the SUV vehicle template 92. Accordingly, the sensor system 10 may determine that the target vehicle data points more closely correlate with the sedan vehicle template 94. Thus, the sensor system 10 may identify the target vehicle 12 as being a sedan and correspondingly assign a sedan as the second target vehicle classification value. Alternatively, if the sensor system 10 determines the target vehicle data points more closely correlate with the SUV template 92, then the sensor system 10 may identify the target vehicle 12 as being an SUV and correspondingly assign an SUV as the second target vehicle classification value.

With reference back to FIG. 3, block 42 relates to the sensor system 10 determining an overall target vehicle classification. The overall target vehicle classification may be determined using the first vehicle classification value, the second vehicle classification value, or a combination of the first and the second vehicle classification values.

Figure 8:
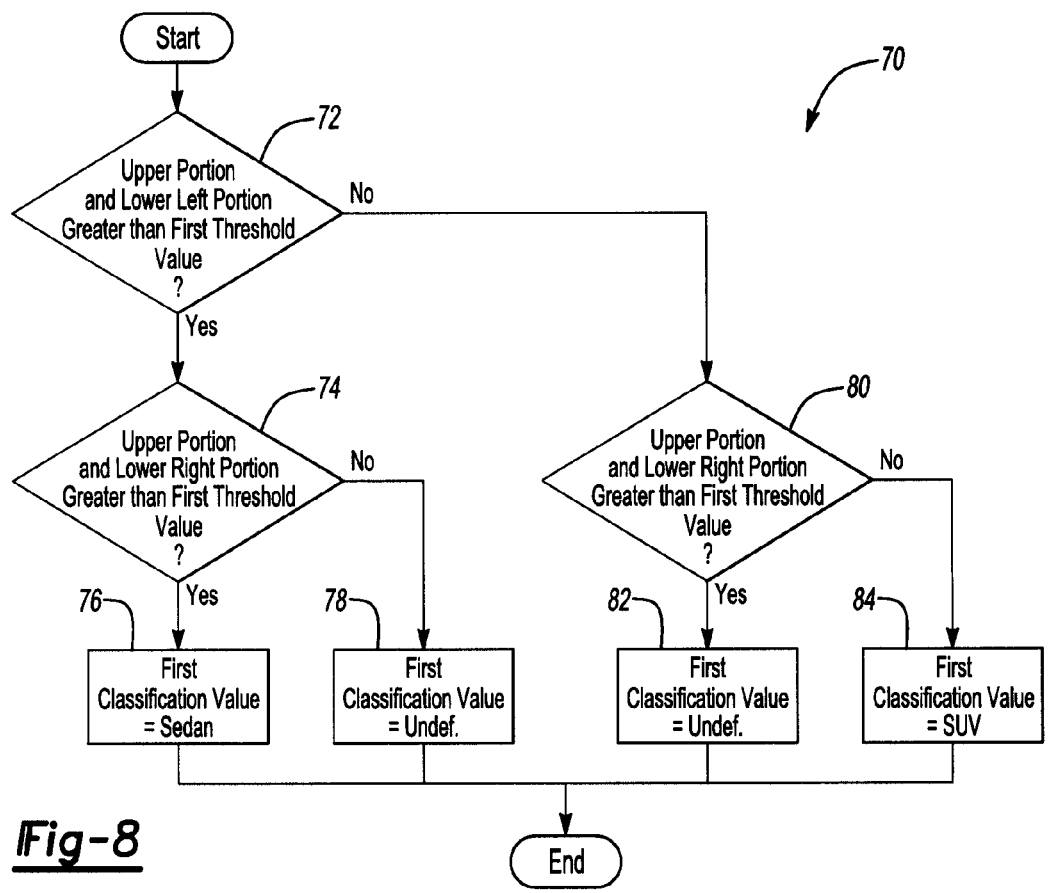
FIG. 8 is a simplified, exemplary flow chart depicting another embodiment of the method described herein.

FIG. 8 is a simplified, exemplary flow diagram 70 demonstrating how the sensor system 10 may determine the first target vehicle classification value. In particular, block 72 relates to the sensor system 10 determining if the delta distance ($\Delta d$), as previously described, between the upper portion 20 and the lower left portion 24 is greater than a first target vehicle threshold value. The first target vehicle threshold value can be any predetermined value suitable for delineating between various vehicle classes, such as an SUV or a sedan. In this example, if the $\Delta d$ between upper portion 20 and lower left portion 24 is greater than the first target vehicle threshold value, then the system continues on to block 74. At block 74 the sensor system 10 determines if the $\Delta d$ between the upper portion 20 and the lower right portion 26 are greater than the first target vehicle threshold value. If so, the sensor system 10 may assign a sedan as vehicle classification value at block 76. If, however, the determination at block 74 is NO, then block 78 may determine that the target vehicle classification is undefined and assign a corresponding value as the first target vehicle classification value.

Alternatively, if the determination back at block 72 is NO, action then proceeds to block 80 for determining if the $\Delta d$ between the upper portion 20 and the lower right portion 26 is greater than the first threshold value. If so, then block 82 may determine that the target vehicle classification is undefined and assign a corresponding value as the first target vehicle classification value. If, however, the determination of block 80 is NO, the sensor system 10 may assign an SUV as the first target vehicle classification value.

Figure 9:
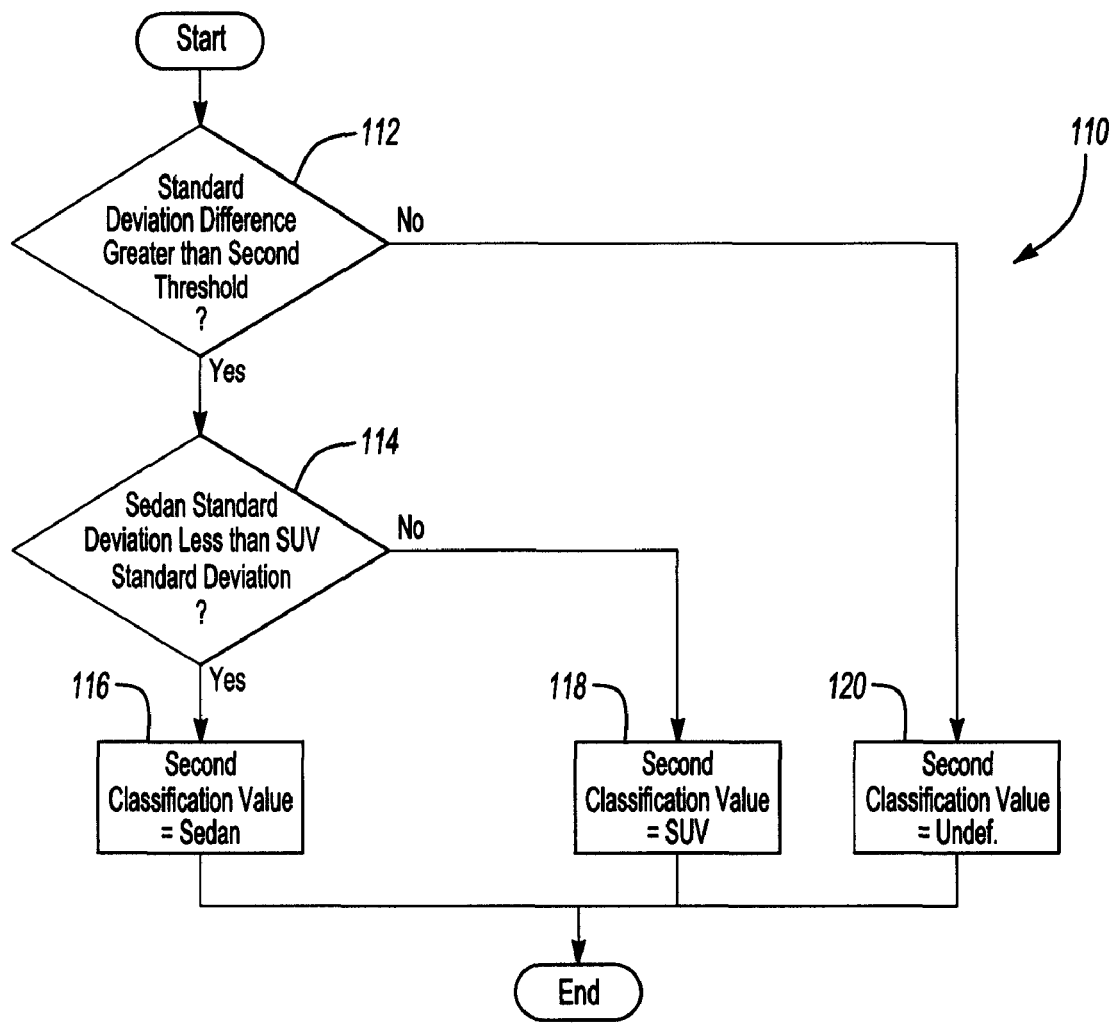
FIG. 9 is a simplified, exemplary flow chart depicting another embodiment of the method described herein.

FIG. 9 is a simplified, exemplary flow diagram 110 demonstrating how the sensor system 10 may determine the second target classification value. In particular, block 112 relates to determining if the absolute difference between the SUV template standard deviation and the sedan template standard deviation, as previously described, is greater than a second target vehicle threshold value. The second target vehicle threshold value can be any predetermined value suitable for identifying whether the absolute difference in standard deviations is great enough to reliably distinguish one target vehicle classification template from the other with respect to the reconstructed target vehicle shape 50.

If the determination at block 112 is YES, then at block 114 the sensor system 10 determines if the sedan template standard deviation is less than the SUV template standard deviation. If so, the sensor system 10 may identify the target vehicle 12 as a sedan and correspondingly assign a sedan as the second target vehicle classification value. Alternatively, if the sedan template standard deviation is greater than the SUV template standard deviation, the sensor system 10 may identify the target vehicle 12 as an SUV and assign an SUV as the second target vehicle classification value at block 118.

Alternatively, referring back to block 112, if the standard deviation difference is less than the second target vehicle threshold value, then at block 120 the sensor system 10 may determine that the calculated standard deviations are too close to provide a reliable indication as to which target vehicle classification template better correlates to the reconstructed target vehicle shape 50. Accordingly, block 120 may determine that the target vehicle identity is undefined and assign a corresponding second target vehicle classification value.

Figure 10:
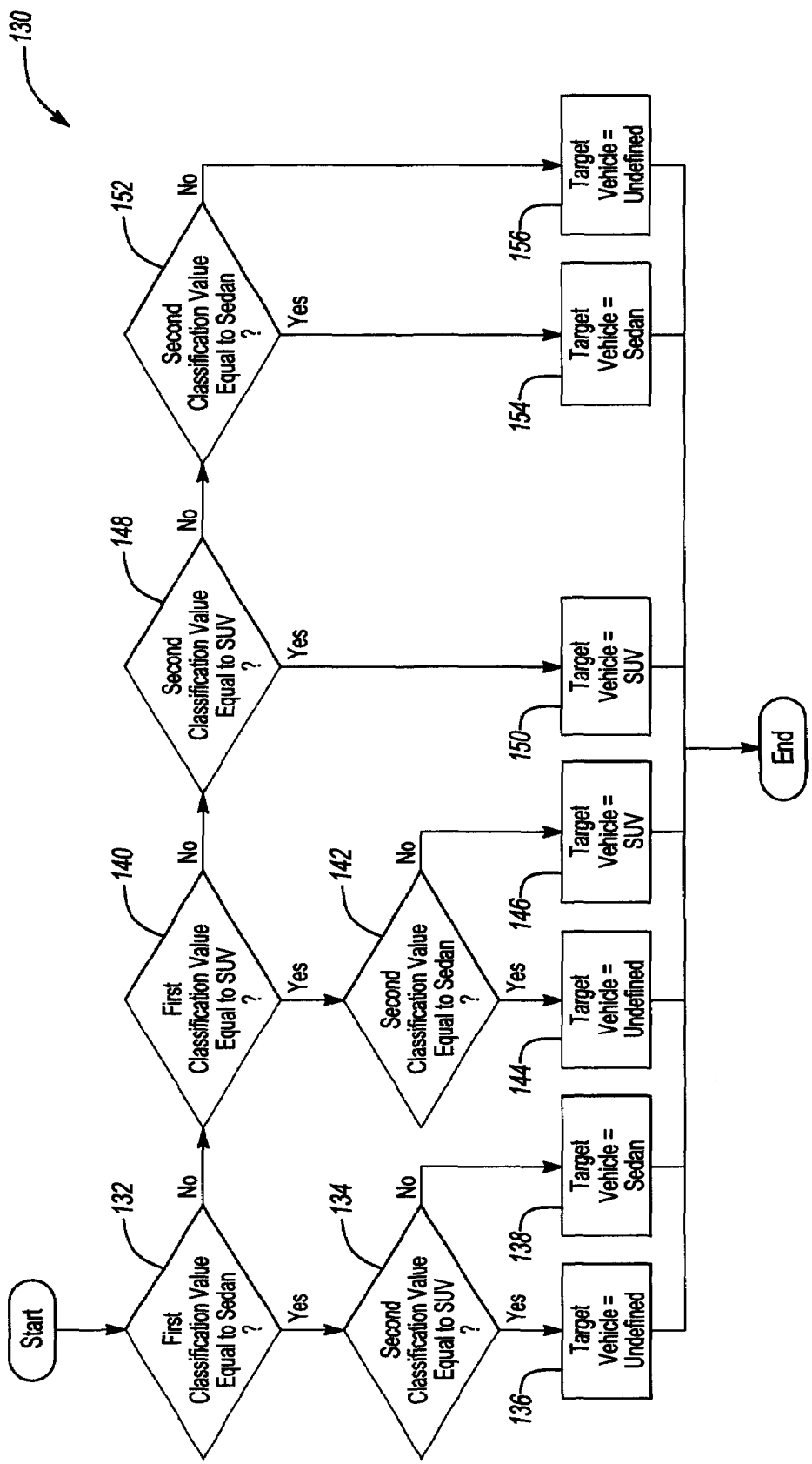
FIG. 10 is a simplified, exemplary flow chart depicting another embodiment of the method described herein.

FIG. 10 is a simplified, exemplary flow diagram 130 demonstrating how the sensor system 10 may use a combination of both the first and second target vehicle classification values to classify the target vehicle 12. In this regard, block 132 may determine whether the first target vehicle classification value assigned is a sedan. If so, block 134 may determine whether the second target vehicle classification value assigned is an SUV. If yes, then block 136 may identifying the target vehicle 12 as being undefined. Alternatively, if the second vehicle classification value assigned is not an SUV, then block 138 may identify the target vehicle 12 as being a sedan.

With reference back to block 132, if the first target vehicle classification value assigned is not a sedan, then block 140 may determine whether the first target vehicle classification value assigned is an SUV. If so, then block 142 may determine whether the second target vehicle classification value assigned is a sedan. If YES, then block 144 may identify the target vehicle 12 as being undefined. Alternatively, if the second target vehicle classification value assigned is not a sedan, then block 146 may identify the target vehicle 12 as being an SUV.

With reference back to block 140, if the first target vehicle classification value assigned is not an SUV, then block 148 may determine whether the second target vehicle classification value assigned is an SUV. If so, then block 150 may identify the target vehicle 12 as an SUV. Alternatively, if the second target vehicle classification value assigned is not an SUV, then block 152 may determine whether the second target vehicle classification value assigned is a sedan. If yes, then block 154 may identify the target vehicle 12 as a sedan. If, however, the second target vehicle classification value assigned is not a sedan either, then block 156 may identify the target vehicle 12 as being undefined.

FIGS. 3, 8, 9, and 10 provide exemplary flow diagrams demonstrating how the sensor system 10 may determine or classify the target vehicle 12. However, the rear end 18 of the target vehicle 12 may be a host of various shapes and sizes. Therefore, the sensor system 10 may need to be adjusted for real world situations.

According to one embodiment of the present application, the sensor system 10 may include a fuzzy logic interface control 19 (see FIG. 1) in order to help further classify the target vehicle 12, particularly when the first and second target vehicle classification values result in the target vehicle 12 being classified as undefined. For example, with reference back to FIG. 10, if the determination at block 140 is affirmative, and the determination at block 142 is affirmative, the sensor system 10 may identify the target vehicle as being undefined (block 144). However, applying the fuzzy logic interface control 19, the first target vehicle classification value may be assigned a first weighted value. Further, the second target vehicle classification value may be assigned a second weighted value. The fuzzy logic interface control 19 may use the first and second weighted values to bias the overall target vehicle classification. For example, suppose the first weighted value is 80% determinative that the target vehicle 12 is an SUV and the second weighted value is 20% determinative that the target vehicle 12 is a sedan, then the sensor system 10 may apply the weighted values and identify the target vehicle 12 as an SUV. Alternatively, suppose the first weighted value is 80% determinative that the target vehicle 12 is an SUV and the second weighted value provides an undefined value, the sensor system 10 may determine the target vehicle 12 as being an SUV. Conversely, an alternate conclusion may arise if, for example, the target vehicle classification values are similarly weighted in favor of a sedan.

In addition, the fuzzy logic interface control 19, may perform real-time analysis on the values received by the sensor system 10. Such real-time analysis may result in the target vehicle classification being altered as the host vehicle 11 approaches the target vehicle 12. For example, suppose as the host vehicle 11 approaches the target vehicle 12 the sensor system 10 receives two sets of data from the plurality of sensors 14. If the first set of received data results in the first weighted value being 80% determinative that the target vehicle 12 is an SUV and the second weighted value being 20% determinative that the target vehicle 12 is a sedan, the target vehicle 12 may be identified as being the SUV. Alternatively, if the second set of received data results in the first weighted value being 20% determinative that the target vehicle 12 is an SUV and the second weighted value being 80% determinative that the target vehicle 12 is a sedan, the target vehicle 12 may be identified as the sedan. The change in classification exemplified above may occur due to the various shapes and sizes of the target vehicle 12. As a result, as the host vehicle 11 approaches the target vehicle 12 the plurality of sensors 14 may reflect off differing portions of the rear end 18 of the target vehicle 12. By updating the weighted values in real-time, the fuzzy logic interface control 19 may operate in order to more accurately classify the target vehicle 12.

Alternatively, suppose the first weighted value is 80% determinative that the target vehicle 12 is an SUV and the second weighted value provides an undefined value, the sensor system 10 may determine the target vehicle 12 as being an SUV. Conversely, an alternate conclusion may arise if, for example, the target vehicle classification values are similarly weighted in favor of a sedan.

With reference back to FIG. 3, the present application also contemplates at block 44 that once the overall target vehicle classification is determined, the sensor system 10 may activate any number of pre-crash safety systems. For example, one pre-crash safety system may include optimizing the seat belt tension applied against an occupant wearing the seatbelt. Such optimization may include lowering the tension of the seatbelt if the overall target vehicle classification value determines collision with a sedan is imminent. Further, optimization may increase the tension of the seatbelt if the overall target vehicle classification value determines collision with an SUV is imminent. Of course, it is fully contemplated that alternate seatbelt tensioning schemes may be incorporated depending upon classification of target vehicle 12. For example, the seatbelt tension may be increased upon determination of an imminent crash with a sedan and increased further upon determination of an imminent crash with an SUV.

Finally, the present application contemplates that the pre-crash safety system may activate a default crash state if the overall target vehicle classification is undefined. The default crash state may optimize the tension of the seatbelt for what is considered to be a worst case crash scenario. For example, if the occupant of the host vehicle 11 is most likely to suffer severe injuries during a crash with an SUV, then any undefined overall target vehicle classifications would result in the seatbelt being optimized for a crash with an SUV. Of course, an undefined target vehicle classification may trigger an alternate seatbelt tensioning scheme without departing from the scope of the present application.

Other pre-crash safety systems the present application contemplates include brake assistance or pre-braking that aids the occupant of the host vehicle 11 in reducing the severity of a collision with the target vehicle 12. The present application also contemplates that any host of other pre-crash safety systems may be included in order to lower the severity of injuries related to vehicle crash situations.

While embodiments of the application may have been illustrated and described, it is not intended that these embodiments illustrate and describe all possible forms of the application. Rather the words used in the above specification are words of description rather than limitation and it is understood that various changes may be made without departing from the spirit and scope of the invention. Thus, specific details disclosed are merely a representative basis for teaching one skilled in the art to practice the present application.

What is claimed:

1. A method for classifying a target vehicle using a sensor system located within a host vehicle, the method comprising:
   acquiring target vehicle data points using at least a first sensor and a second sensor, the first sensor acquiring the target vehicle data points associated with at least an upper portion of the target vehicle, and the second sensor acquiring the target vehicle data points associated with at least a lower portion of the target vehicle;
   calculating a delta distance between the location of the upper portion and the lower portion based upon the acquired target vehicle data points, wherein the delta distance is compared against a first target vehicle threshold value in order to determine a first target vehicle classification value; and
   classifying the target vehicle using the first target vehicle classification value.

2. The method of claim 1 further comprising calculating a relative traveling distance of the host vehicle in relation to the target vehicle using the first and second sensor, and combining the calculated relative traveling distance with the data from the upper portion and the lower portion in order to reconstruct a target vehicle shape.

3. The method of claim 2 further comprising:
   calculating a standard deviation between each of a plurality of target vehicle templates and the reconstructed target vehicle shape;
   determining a second target vehicle classification value corresponding to a target vehicle data template that provides the smallest standard deviation value in relation to the reconstructed target vehicle shape; and
   classifying the target vehicle using the first and second target vehicle classification values.

4. The method of claim 3 further comprising:
   comparing each calculated standard deviation value to each other; and
   assigning the second target vehicle classification value as undefined if the difference between a pair of standard deviation values is less than a second target vehicle threshold value.

5. The method of claim 3 further comprising:
superimposing at least a first target vehicle data template and a second target vehicle template in order to align the reconstructed target vehicle shape at a common intersection point so that each standard deviation may be calculated.

6. The method of claim 3 further comprising:
applying a fuzzy logic interface to determine a first weight value for the first target vehicle classification value, wherein the first weight value biases the classification of the target vehicle;
applying the fuzzy logic interface to determine a second weight value for the second target vehicle classification value, wherein the second weight value biases the classification of the target vehicle.

7. The method of claim 6 further comprising classifying the target vehicle according to the first and second target vehicle classification values based at least in part upon the first weight value and the second weight value.

8. The method of claim 1, wherein the at least first and second sensors are distance sensors.

9. The method of claim 1 further comprising acquiring the target vehicle data points using a plurality of closing velocity (CV) sensors.

10. The method of claim 1 further comprising enabling at least one pre-crash safety system based upon the classification of the target vehicle.

11. The method of claim 1 further comprising adjusting the sensor system acquisition distance in response to the transmittance coefficient of the front windshield of the host vehicle and the acquired relative speed as the host vehicle approaches the target vehicle.

12. The method of claim 1 further comprising classifying the target vehicle as a vehicle type from the group consisting of sedan, SUV, truck, coupe, crossover, semi, motorcycle and station wagon according to the first target vehicle classification value.

13. A method for classifying a target vehicle using a CV sensor system located within a host vehicle, the method comprising:
acquiring target vehicle data points using at least a first CV sensor and a second CV sensor, the first CV sensor acquiring the target vehicle data points associated with at least an upper portion of the target vehicle, and the second CV sensor acquiring the target vehicle data points associated with at least a lower portion of the target vehicle;
calculating a relative traveling distance of the host vehicle in relation to the target vehicle using the first and second CV sensor, and combining the calculated relative traveling distance with the data from the upper portion and the lower portion in order to reconstruct a target vehicle shape;
calculating a standard deviation between each of a plurality of target vehicle templates and the reconstructed target vehicle shape, wherein a second target vehicle classification value is determined using a target vehicle template that generates the smallest standard deviation in relation to the reconstructed target vehicle shape; and
classifying the target vehicle using the second target vehicle classification value.

14. The method of claim 13 further comprising classifying the target vehicle as a vehicle type from the group consisting of sedan, SUV, truck, coupe, crossover, semi, motorcycle and station wagon according to the second target vehicle classification value.

15. The method of claim 13 further comprising:
calculating a delta distance between the location of the upper portion and the lower portion, wherein the delta distance is compared against a first target vehicle threshold value in order to determine a first target vehicle classification value; and
classifying the target vehicle using the first and second target vehicle classification values.

16. The method of claim 13 further comprising enabling at least one pre-crash safety system based upon the classification of the target vehicle.

17. The method of claim 16 further comprising enabling the at least one pre-crash safety system to a default state when the target vehicle classification value is undefined.

18. A sensor system for classifying the rear-end of a target vehicle, the sensor system comprising:
a plurality of target vehicle sensors, acquiring a series of target vehicle data points, the target vehicle data points defining at least an upper and lower portion of the target vehicle; and
a controller receiving the acquired target vehicle data points from the plurality of target vehicle sensors, wherein the controller determines a horizontal distance between the acquired target vehicle data points corresponding to the upper portion and the lower portion, compares the horizontal distance to a first target vehicle threshold value, and assigns a first target vehicle classification value based upon the first target vehicle threshold value and the horizontal distance in order to classify the target vehicle.

19. The sensor system of claim 18, wherein the acquired target vehicle data points provide a reconstructed target vehicle shape that is compared to a plurality of target vehicle templates by determining a standard deviation value corresponding to each of the plurality of target vehicle templates in relation to the reconstructed target vehicle shape, the controller assigning a second target vehicle classification value in order to classify the target vehicle based upon the comparison of each standard deviation value.

20. The sensor system of claim 18, wherein the plurality of target vehicle sensors include closing velocity (CV) sensors.

* * * * *